(12) United States Patent
Chen

(10) Patent No.: US 7,971,199 B1
(45) Date of Patent: Jun. 28, 2011

(54) MOBILE DEVICE WITH A SELF-UPDATING UPDATE AGENT IN A WIRELESS NETWORK

(75) Inventor: Shao-Chun Chen, Aliso Viejo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1147 days.

(21) Appl. No.: 11/120,556

(22) Filed: May 3, 2005

Related U.S. Application Data

(60) Provisional application No. 60/567,894, filed on May 3, 2004.

(51) Int. Cl.
 G06F 9/44 (2006.01)
 G06F 15/177 (2006.01)

(52) U.S. Cl. .................. 717/168; 709/220; 709/221

(58) Field of Classification Search .................. None
 See application file for complete search history.

(56) References Cited

U.S. PATENT DOCUMENTS

| | | | |
|---|---|---|---|
| 5,261,055 A | 11/1993 | Moran et al. | |
| 5,442,771 A | 8/1995 | Filepp et al. | |
| 5,479,637 A | 12/1995 | Lisimaque et al. | |
| 5,579,522 A | 11/1996 | Christeson et al. | |
| 5,596,738 A | 1/1997 | Pope | |
| 5,598,534 A | 1/1997 | Haas | |
| 5,608,910 A | 3/1997 | Shimakura | |
| 5,623,604 A | 4/1997 | Russell et al. | |
| 5,666,293 A | 9/1997 | Metz et al. | |
| 5,752,039 A | 5/1998 | Tanimura | |
| 5,778,440 A | 7/1998 | Yiu et al. | |
| 5,790,974 A | 8/1998 | Tognazzini | |
| 5,878,256 A | 3/1999 | Bealkowski et al. | |
| 5,960,445 A | 9/1999 | Tamori et al. | |
| 6,009,497 A | 12/1999 | Wells et al. | |
| 6,038,636 A | 3/2000 | Brown, III et al. | |

(Continued)

FOREIGN PATENT DOCUMENTS

CA 2339923 A 3/2000

(Continued)

OTHER PUBLICATIONS

Kim Oppalfens, Sccm 2007 client agent deployment suing software updates [online], 2007 [retrieved on May 3, 2011], pp. 1-3. Retrieved from the Internet: <URL: http://blogcastrepository.com/blogs/kim_oppalfenss_systems_management_ideas/archive/2007/05/19/sccm-2007-client-agent-deployment-using-software-updates.aspx>.*

(Continued)

*Primary Examiner* — Thuy Dao
*Assistant Examiner* — Hanh T Bui

(57) ABSTRACT

A mobile device with a self-backup mechanism may conduct an implicit backup of update agent code during an update of firmware in the electronic device, using a package of update information. Another embodiment may perform an explicit backup of update agent code before the update of other firmware is performed. In an electronic device employing NAND flash non-volatile memory for firmware storage, a boot code may copy all firmware, including update agent code, from the non-volatile memory to RAM for execution. A determination may be made whether a backup copy of update agent code exists, and the existing update agent code may be updated by a copy of the update agent code stored in an area in RAM. An updated update agent code may be capable of employing update status data used by old update agent code, as well as update status data used by an updated update agent code.

22 Claims, 10 Drawing Sheets

U.S. PATENT DOCUMENTS

| | | | |
|---|---|---|---|
| 6,041,333 A * | 3/2000 | Bretschneider et al. ............... 1/1 |
| 6,064,814 A | 5/2000 | Capriles et al. |
| 6,073,206 A | 6/2000 | Piwonka et al. |
| 6,073,214 A | 6/2000 | Fawcett |
| 6,088,759 A | 7/2000 | Hasbun et al. |
| 6,105,063 A | 8/2000 | Hayes, Jr. |
| 6,112,024 A | 8/2000 | Almond et al. |
| 6,112,197 A | 8/2000 | Chatterjee et al. |
| 6,126,327 A | 10/2000 | Bi et al. |
| 6,128,695 A | 10/2000 | Estakhri et al. |
| 6,145,012 A * | 11/2000 | Small .......................... 709/246 |
| 6,157,559 A | 12/2000 | Yoo |
| 6,163,274 A | 12/2000 | Lindgren |
| 6,198,946 B1 | 3/2001 | Shin et al. |
| 6,279,153 B1 | 8/2001 | Bi et al. |
| 6,311,322 B1 | 10/2001 | Ikeda et al. |
| 6,321,263 B1 * | 11/2001 | Luzzi et al. ................... 709/224 |
| 6,438,585 B2 | 8/2002 | Mousseau et al. |
| 6,457,175 B1 * | 9/2002 | Lerche .......................... 717/173 |
| 6,536,038 B1 * | 3/2003 | Ewertz et al. ................. 717/168 |
| 6,594,723 B1 * | 7/2003 | Chapman et al. ............ 711/103 |
| 6,684,396 B1 * | 1/2004 | Brittain et al. ............... 717/168 |
| 6,880,051 B2 * | 4/2005 | Timpanaro-Perrotta ...... 711/162 |
| 7,080,372 B1 * | 7/2006 | Cole ............................. 717/173 |
| 7,350,205 B2 * | 3/2008 | Ji .................................. 717/172 |
| 7,415,706 B1 * | 8/2008 | Raju et al. ..................... 717/170 |
| 7,689,981 B1 * | 3/2010 | Gustafson .................... 717/168 |
| 7,698,698 B2 * | 4/2010 | Skan ............................. 717/168 |
| 7,725,889 B2 * | 5/2010 | Gustafson et al. ........... 717/168 |
| 7,797,693 B1 * | 9/2010 | Gustafson et al. ........... 717/168 |
| 2001/0029178 A1 * | 10/2001 | Criss et al. .................... 455/419 |
| 2001/0047363 A1 | 11/2001 | Peng |
| 2001/0048728 A1 | 12/2001 | Peng |
| 2002/0078209 A1 | 6/2002 | Peng |
| 2002/0087668 A1 * | 7/2002 | San Martin et al. .......... 709/221 |
| 2002/0092010 A1 * | 7/2002 | Fiske ............................ 717/168 |
| 2002/0100036 A1 * | 7/2002 | Moshir et al. ................ 717/173 |
| 2002/0116261 A1 | 8/2002 | Moskowitz et al. |
| 2002/0131404 A1 | 9/2002 | Mehta et al. |
| 2002/0152005 A1 | 10/2002 | Bagnordi |
| 2002/0156863 A1 | 10/2002 | Peng |
| 2002/0157090 A1 | 10/2002 | Anton, Jr. |
| 2002/0188886 A1 * | 12/2002 | Liu et al. .......................... 714/6 |
| 2003/0033599 A1 | 2/2003 | Rajaram et al. |
| 2003/0037075 A1 | 2/2003 | Hannigan et al. |
| 2003/0061384 A1 | 3/2003 | Nakatani |
| 2003/0182414 A1 * | 9/2003 | O'Neill ......................... 709/223 |
| 2004/0031027 A1 * | 2/2004 | Hiltgen ......................... 717/170 |
| 2004/0092255 A1 * | 5/2004 | Ji et al. ......................... 455/419 |
| 2004/0103340 A1 * | 5/2004 | Sundareson et al. .............. 714/6 |
| 2004/0123282 A1 * | 6/2004 | Rao ............................... 717/168 |
| 2004/0243991 A1 * | 12/2004 | Gustafson et al. ........... 717/168 |
| 2005/0204353 A1 * | 9/2005 | Ji .................................. 717/168 |
| 2005/0257214 A1 * | 11/2005 | Moshir et al. ................ 717/171 |
| 2007/0294684 A1 * | 12/2007 | Kumashiro et al. ........... 717/168 |

FOREIGN PATENT DOCUMENTS

| | | |
|---|---|---|
| JP | 8202626 A | 8/1996 |
| KR | 2002-0034228 A1 | 5/2000 |
| KR | 2001-0100328 A1 | 11/2001 |

OTHER PUBLICATIONS

J. Probst et al., Flexible configuration and concurrent upgrade for the IBM eServer z900 [online], 2002 [retrieved on May 3, 2011], pp. 1-8. Retrieved from the Internet: <URL: http://ieeexplore.ieee.org/stamp/stamp.jsp?tp=&arnumber=5389018).*

"Focus on OpenView a guide to Hewlett-Packard's Network and Systems Management Platform", Nathan J. Muller, pp. 1-291, CBM Books, published 1995.

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1$^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

MOBILE DEVICE WITH A SELF-UPDATING UPDATE AGENT IN A WIRELESS NETWORK

RELATED APPLICATIONS

The present application makes reference to, claims priority to, and claims benefit of U.S. Provisional Patent Application Ser. No. 60/567,894, entitled "MOBILE DEVICE WITH A SELF-UPDATING UPDATE AGENT IN A WIRELESS NETWORK", filed May 3, 2004, the complete subject matter of which is hereby incorporated herein by reference, in its entirety.

The present application makes reference to PCT Application having publication number WO/02/41147 A1 and PCT Application No. PCT/US01/44034, entitled "System and Method for Updating and Distributing Information", filed Nov. 19, 2001, the complete subject matter of which is hereby incorporated herein by reference, in its entirety.

The present application also makes reference to U.S. Provisional Patent Application Ser. No. 60/249,606, entitled "System and Method for Updating and Distributing Information", filed Nov. 17, 2000, the complete subject matter of which is hereby incorporated herein by reference, in its entirety.

The present application also makes reference to U.S. patent application Ser. No. 10/932,175, entitled "Tri-Phase Boot Process In A Mobile Handset", filed Sep. 1, 2004, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. Electronic devices, such as high-end mobile phones, often contain a flash memory card, sometimes called an MMC card. They contain a flash memory card reader that is employed to read information on the flash memory cards that are inserted by end users.

Quite often, flash memory cards are used by the end user to store content such as digital photographs or audio files.

If firmware or firmware components are to be changed, it is often very tricky to update the firmware components in an electronic device. The electronic device must have sufficient memory available to download an update package and to execute an update process. Changes to firmware or firmware components of the electronic device must be performed in a fault tolerant mode and fault tolerant code are not easy to implement.

Typically, attempts to upgrade firmware and/or software in electronic devices, such as GSM mobile phones, are often hampered by limited user interaction capabilities and slow communication speeds on these devices. Typically, end user interactions cannot be relied upon to help fix problems with a device, as user input can be erroneous. In addition, some electronic devices may not have sufficient memory to store a large update package. Some devices with an update agent used for updating firmware and/or software are not capable of updating the update agent itself.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or device supporting firmware update using an update agent in a mobile device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the present invention relate generally to the process of updating software/firmware in electronic devices, and more specifically, to the use of an update agent for updating firmware/software in an electronic device. The following discussion makes reference to the term "electronic device" that is used herein to refer to mobile electronic devices such as, for example, a mobile handset, a cellular phone, a personal digital assistant (PDA), a pager, and a personal computer, to name just a few. Although the listed example electronic devices are mobile devices, application of the present invention is not limited in this manner, as representative embodiments of the present invention may be employed in a wide variety of electronic devices, both fixed and mobile.

Electronic devices may be adapted to access servers to retrieve update information for updating memory in the electronic devices. An electronic device may be, for example, a mobile electronic device having firmware/software such as mobile cellular phone handsets, personal digital assistants (PDAs), pagers, MP-3 players, digital cameras, etc. Update information may comprise information that modifies or changes firmware/software and/or software components installed in the electronic device. In a representative embodiment of the present invention, update information may comprise a set of executable instructions for converting a first version of code to an updated/second version of code. The update information may add new services to the electronic device, as desired by a service provider, device manufacturer, or an end-user, and/or may fix bugs (e.g., software errors) in the operating code of the electronic device. In a representative embodiment of the present invention, update information may comprise an update package.

Figure 1:
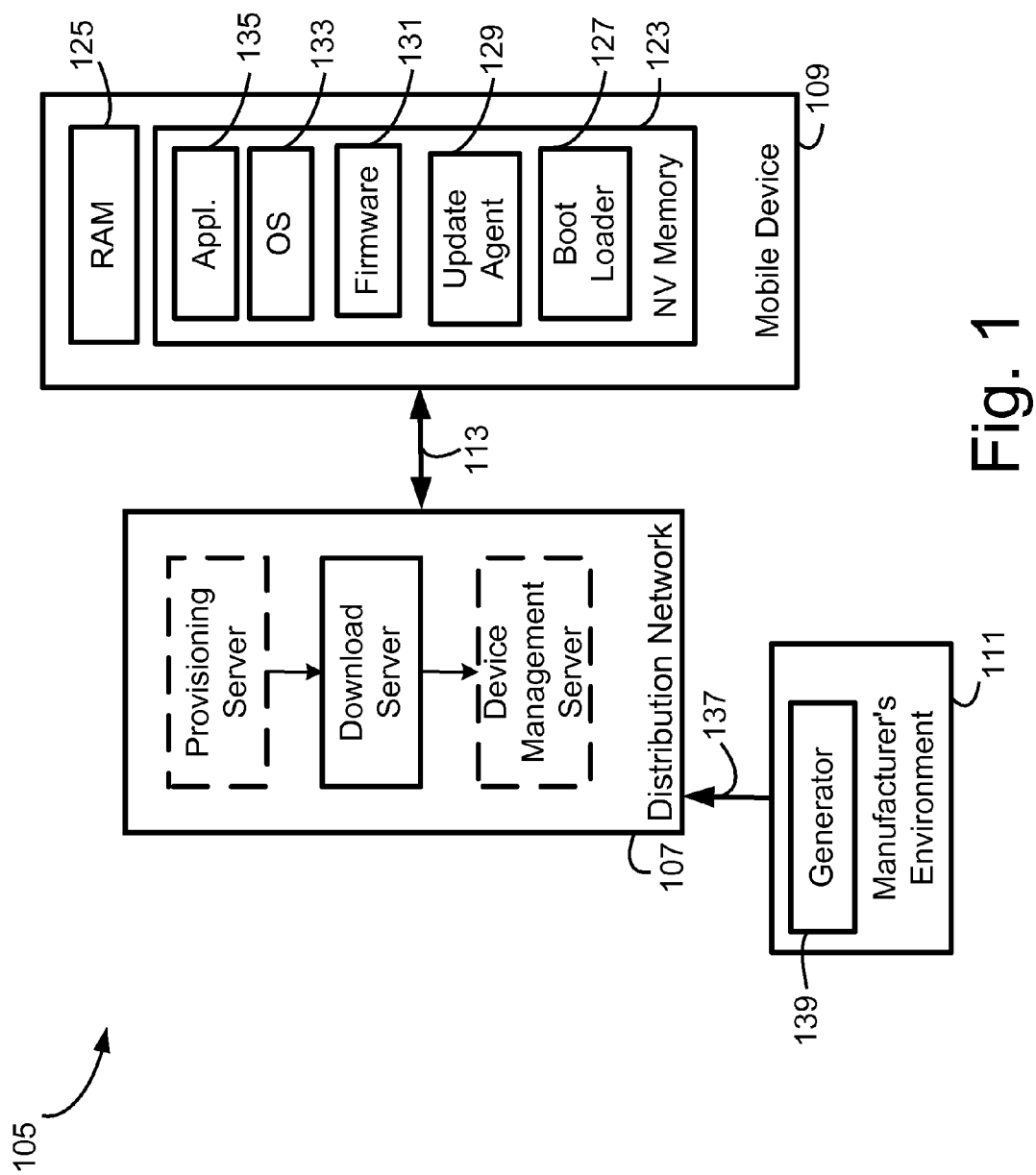
FIG. 1 is perspective block diagram of an exemplary mobile network comprising a mobile device with a non-volatile memory, a distribution network with which the mobile device is communicatively coupled via a communication path, and an optional manufacturer's environment communicatively coupled to the distribution network via a communication path, in accordance with a representative embodiment of the present invention.

FIG. 1 is perspective block diagram of an exemplary mobile network 105 comprising a mobile device 109 with a non-volatile memory 123, a distribution network 107 with which the mobile device 109 is communicatively coupled via a communication path 113, and an optional manufacturer's environment 111 communicatively coupled to the distribution network 107 via a communication path 137, in accordance with a representative embodiment of the present invention. The manufacturer's environment 111 may comprise a generator 139 that generates update packages that are distributed by the distribution network 107 to the mobile device 109. The communication paths 113, 137 may comprise, for example, a wire or wireless link such as a cellular network, an intranet network, an Internet network, a public switched telephone network, to name only a few. The update package may comprise, for example, a set of executable instructions for converting a first version of code to a second version of code. An example of a generator and set of instructions in accordance with a representative embodiment of the present invention may be found in the PCT Application having publication number WO/02/41147 A1 and PCT Application No. PCT/US01/44034, entitled "System and Method for Updating and Distributing Information", filed Nov. 19, 2001, the complete subject matter of which is hereby incorporated herein by reference, in its entirety.

As shown in FIG. 1, the mobile device 109 comprises the non-volatile memory 123 and a RAM 125. The non-volatile memory 123 comprises a boot loader 127, an update agent 129 used to update a firmware and/or software in the non-volatile memory 123 of the mobile device 109, a firmware 131, an operating system (OS) 133 and applications 135. The update agent 129 may be employed by the mobile device 109 to update firmware and/or software resident in the NV memory 123. In a representative embodiment of the present invention, the update agent 129 may be referred to as 'close-to the-metal' (i.e., closely coupled to the hardware circuitry of the mobile device 109), and may be part of the firmware 131 of the mobile device 109. The update agent 129 may be capable of updating the firmware 131 in a fault-tolerant mode, using a bank-by-bank update process. The status of the update activity may not be progressively stored, but may be determined using pre-computed cyclic redundancy checks (CRCs) or digital signatures provided in an update package retrieved from the distribution network 107.

In a representative embodiment in accordance with the present invention, update agent code such as the update agent 129 of FIG. 1, for example, may be self-updating, i.e. it may be capable of updating its own code. In one representative embodiment of the present invention, the update package may provide information (e.g., a flag, variable, or parameter) to indicate that the update package contains information that may be used to update the update agent 129 itself. In such a representative embodiment, the update agent 129 may determine based on, for example, a 'UA_Update' flag, whether it is desired that the update agent 129 back itself up (e.g., for fault-tolerance) before an update of the update agent 129 is attempted. If this 'UA_Update' flag is set to indicate that the update package does not affect the update agent code, then the update agent 129 may elect not to back up its own code.

In another representative embodiment of the present invention, the update agent 129 may create a backup of the its own code before starting the update process, regardless of the contents of the update package, or the mobile device firmware and/or software components that it is used to update. In this case, a flag, variable, or parameter such as the 'UA_Update' flag mention above may not be employed. In a representative embodiment of the present invention, a backup of the update agent code may occur after an initial 'survey' activity, and before the 'transformation' activity used to conduct the actual update process. The 'survey' activity may be employed, for example, to determine whether the previous update package was interrupted. The 'survey' activity may involve computing CRC values (or, for example, other signatures or checksums) of specific blocks of the NV memory 123, and comparing the CRCs to pre-computed CRCs (or signatures or checksums) provided in the update package. Such pre-computed CRCs may be provided by, for example, a generator such as the generator 139 of FIG. 1.

In a representative embodiment of the present invention, an update agent in a mobile device such as, for example, the mobile device 109 may be capable of updating its own update agent 129 by employing update packages provided by the distribution network 107. The mobile device 109 may be capable of updating the update agent 129 first, and then updating other firmware and/or software such as the firmware 131 or software 133, 135, for example, employing the newer/updated update agent 129.

By employing a representative embodiment of the present invention, the complexity of a generator employed in the generation of the update packages used to performed handle the Update Agent update is reduced, and the generator is able to handle the cacheable write units more efficiently.

Figure 2:
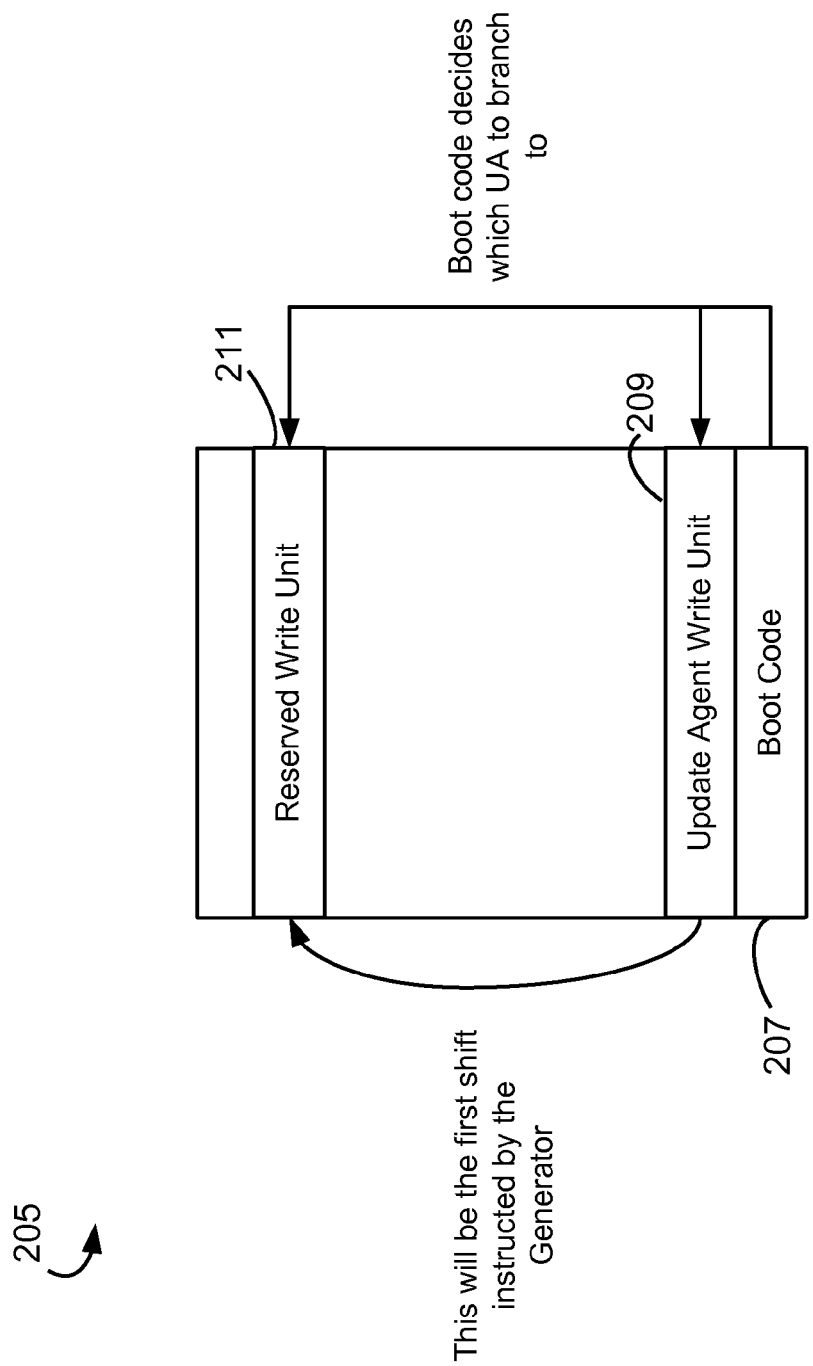
FIG. 2 is a block diagram of an exemplary memory arrangement used by a tri-phase boot technique in a mobile device such as the mobile device of FIG. 1, for example, that is capable of updating its own update agent that may correspond to, for example, the update agent of FIG. 1, and wherein the backing up of the update agent in the mobile device is implicit to the update agent itself, in accordance with a representative embodiment of the present invention.

FIG. 2 is a block diagram of an exemplary memory arrangement 205 used by a tri-phase boot technique in a mobile device such as the mobile device 109 of FIG. 1, for example, that is capable of updating its own update agent that may correspond to, for example, the update agent 129 of FIG. 1, and wherein the backing up of the update agent in the mobile device is implicit to the update agent itself, in accordance with a representative embodiment of the present invention. In a representative embodiment of the present invention, the backup of the update agent may be done through the use of a first write unit shift when the update agent starts, as instructed by a generator of the update package via appropriate instructions in the update package. A reserved write unit shown in FIG. 2 by reserved write unit 211 may be used to hold the backup update agent copied from update agent write unit 209 by the use of the first write unit shift. The boot code 207 in the mobile device (e.g., mobile device 109) may decide which update agent, the original or a copy of the original, is to be invoked if an update is to be conducted. In a representative embodiment of the present invention, the update agent may be one write unit in length, in that the generator 139 may not employ preprocessing steps before instructing the update agent to perform the first write unit shift. Two copies of update agent initialization code may be placed into that single write unit, in a representative embodiment of the present invention employing memory relocation in the update agent. This may be done because the update agent initialization code may be executed in two different locations, in the original update agent write unit 209, and in the copy in the reserved write unit 211.

In some representative embodiments of the present invention, an update agent such as, for example, the update agent 129 may be of a size that fits into a single physical block of non-volatile memory. This may permit simplified operation. In other representative embodiments of the present invention such as, for example, when NAND flash memory is employed, a more involved embodiment may be employed, in that the physical block size for NAND flash non-volatile memory is typically only 16K bytes in length. A representative embodiment of the present invention may support those electronic devices in which a physical block of non-volatile memory (e.g., NAND flash memory) is not large enough to contain an update agent such as, for example, the update agent 129 of FIG. 1. A representative embodiment of the present invention may support the handling of bad blocks and running bad blocks in non-volatile memory, using the skip-move method described herein, and for those memory devices in which a logical write unit comprises more than one physical write unit of memory.

In a representative embodiment of the present invention, a generator such as, for example, the generator 139 of FIG. 1 may incorporate instructions in an update package to back up an update agent such as the update agent 209, for example, during a tri-phase boot process. An example of a tri-phase boot process may be found in U.S. patent application Ser. No. 10/932,175, entitled "Tri-Phase Boot Process In A Mobile Handset", filed Sep. 1, 2004, the complete subject matter of which is hereby incorporated herein by reference, in its entirety. In a representative embodiment of the present invention, the generator 139 may know the location of an update agent write unit (e.g., update agent write unit 209) and the location of a reserved write unit (e.g., reserved write unit 211). The generator 139, for example, may instruct the update agent 209 to shift the update agent write unit 209 (e.g., in which the update agent 129 is located) to the reserved write unit 211 first implicitly. The term "implicitly" is used herein to refer to a shift or move that is performed by an update agent as part of the processing of the contents of an update package (i.e., update information), and not as a separate operation or action that is independent of the contents of the update package. The generator 139 may know (e.g., via a passed parameter or value) that a predictor component (not shown) of the generator 139 may not perform instruction prediction on the update agent write unit 209.

A representative embodiment of the present invention may employ a tri-phase boot technique of re-booting a mobile device that is capable of updating its own update agent. with the option to initiate an update wherein an update agent is capable of self-backup action. In such an embodiment, an update agent such as, for example, the update agent 129 of FIG. 1 may perform the backup of its own code, instead of a generator of an update package such as the generator 139 incorporating instructions into the update package to back up the code of the update agent 129. The generator 139 does not incorporate instructions in the update package for the backup of the update agent, in order to support the situation where the update agent 129 itself is to be updated. The generator 139 does not instruct the update agent 129 to create a backup initially via an update package. As in the previous example, above, a boot loader (e.g., boot loader 127 of FIG. 1, that may correspond to, for example, boot code 207 in FIG. 2) may determine which copy of the update agent is to be loaded for execution. A boot loader such as, for example, the boot loader 127 may perform a load (e.g. a copy or memory relocation) of the entire update agent 129, for example, into a region of RAM in which the update agent 129 will be executed.

In representative embodiments of the present invention, the approach use for performing this self-backup of the update agent 129 may be the basically the same, whether the memory used is NOR or NAND-type flash memory. A difference may be in how the update agent 129 is verified and loaded. For the case of NOR flash memory, the update agent 129 may be verified and loaded directly from the addressable memory space in which the update agent is stored (e.g., update agent write unit 209). For the case of NAND flash memory, the update agent 129 may be loaded using a skip-move method, before verification is performed. In a representative embodiment of the present invention, because bad blocks can occur in NAND memory, the skip-move method may skip whole blocks of NAND flash memory marked as "bad" in order to retrieve the code/application from good block of NAND flash memory, and to load them into RAM for execution, update or manipulation, for example.

Figure 3:
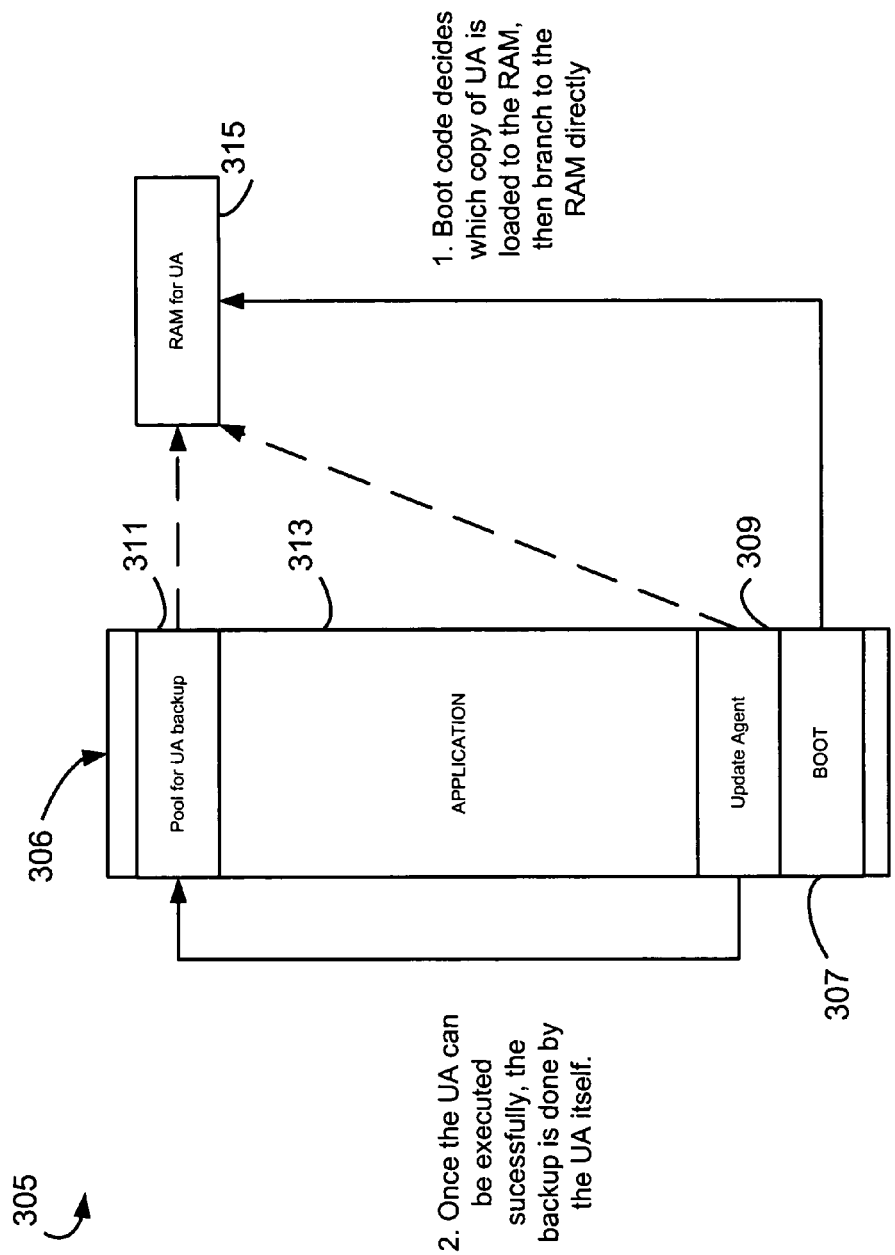
FIG. 3 is a block diagram of an exemplary memory arrangement used by a tri-phase boot technique in a mobile device such as the mobile device of FIG. 1, for example, that employs NOR flash NV memory wherein an update agent resident in the NOR flash NV memory is capable of performing a self-backup, in accordance with a representative embodiment of the present invention.

FIG. 3 is a block diagram of an exemplary memory arrangement 305 used by a tri-phase boot technique in a mobile device such as the mobile device 109 of FIG. 1, for example, that employs NOR flash NV memory 306 wherein an update agent 309 resident in the NOR flash NV memory 306 is capable of performing a self-backup, in accordance with a representative embodiment of the present invention. The illustration of FIG. 3 shows a NOR flash NV memory 306 that may correspond to, for example, the NV memory 123 of FIG. 1. Although the NOR flash NV memory 306 in this example is described herein is a type of flash NV memory, other forms of NV memory may be employed without departing from the spirit and scope of the present invention. The NOR flash NV memory 306 comprises a boot code 307, an update agent 309, application code 313, and a memory pool 311 for update agent backup. The memory arrangement 305 also comprises a RAM memory 315 that may be employed for the execution of update agent code, for example. In a representative embodiment of the present invention, the update agent 309 may be verified and loaded from the addressable memory space of NOR flash NV memory 306 directly into the RAM memory 315 for execution, by the boot code 307. The boot code 307 may determine which copy of an update agent (e.g., a source copy in the memory space represented by the update agent 309, or a backup copy of an update agent in memory pool 311) is loaded to the RAM memory 315 for execution. The boot code 307 may then branch to the RAM memory 315 directly to execute the loaded update agent. If the update agent 309 (i.e., the source copy) is loaded into the RAM memory 315 by the boot code 307, a backup of the update agent 309 may be performed by the update agent (e.g., the copy of update agent 309) in the RAM memory 315, into the memory pool 311.

Figure 4:
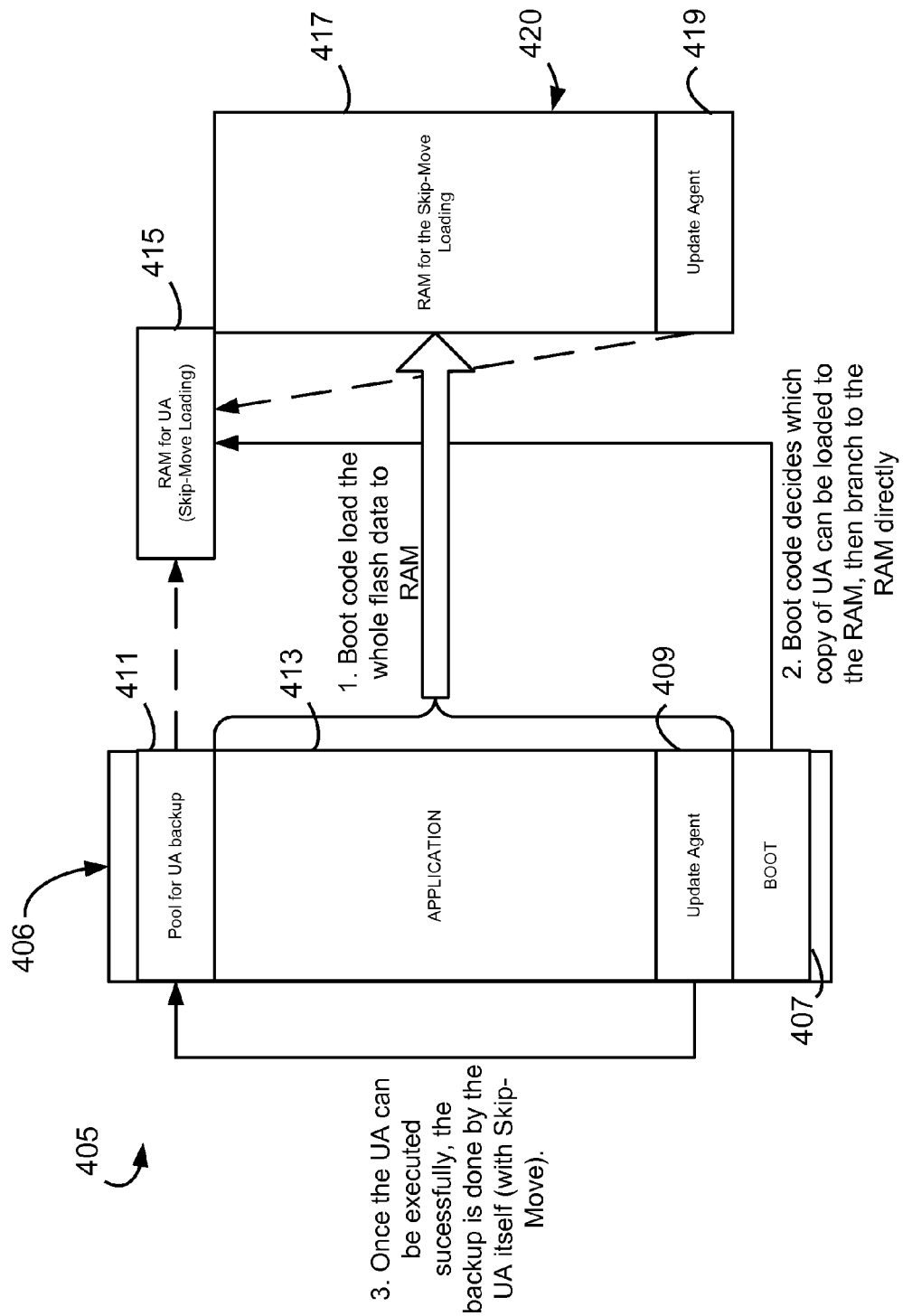
FIG. 4 is a block diagram of an exemplary memory arrangement used by a tri-phase boot technique in a mobile device such as the mobile device of FIG. 1, for example, that employs NAND flash NV memory wherein an update agent resident in the NAND flash NV memory is capable of performing a self-backup, in accordance with a representative embodiment of the present invention.

FIG. 4 is a block diagram of an exemplary memory arrangement 405 used by a tri-phase boot technique in a mobile device such as the mobile device 109 of FIG. 1, for example, that employs NAND flash NV memory 406 wherein an update agent 409 resident in the NAND flash NV memory 406 is capable of performing a self-backup, in accordance with a representative embodiment of the present invention. The illustration of FIG. 4 shows NAND flash NV memory 406 comprising a boot code 407, an update agent 409, application code 413, and a memory pool 411. In addition, the memory arrangement 405 comprises a RAM 415 for execution of an update agent, and a RAM 420 that may be used for skip-move loading the update agent 409 and application code 413 from the NAND flash NV memory 406, to an update agent portion 419 and an application code portion 417, respectively, of the RAM 420. In a representative embodiment of the present invention, a boot code such as, for example, the boot code 407 may load the contents of the update agent 409 and application code 413 portions of the NAND flash NV memory 406 data to the update agent portion 419 and application code portion 417 of the RAM 420, to enable the execution of the update agent 409 and application code 413. After skip-move loading the contents of the NAND flash NV memory 406 to RAM 420, the boot code 407 may determine which version of the update agent code is to be loaded into RAM 415 for execution, an original version of the update agent 409 (which has been loaded into RAM into a section 419), or a backup copy of the update agent 411. If the original version (i.e., the original copy) of the update agent 409 (skip-moved to update agent portion 419 of RAM 420) is loaded into RAM 415, then the original copy is executed in RAM 415. This may create a backup (e.g., using skip-move operations) of the update agent code 409 in the memory pool 411 for update agent backup. The memory pool 411 comprises a segment of NAND flash NV memory 406 that has been reserved for backup purposes, or is currently available for use.

An advantage of a representative embodiment of the present invention is that the complexity of a generator capable of performing an update of an update agent such as, for example, the update agent 129 of FIG. 1, is reduced. Under the representative embodiment of the present invention illustrated above, a generator such as, for example, the generator 139 of FIG. 1 may incorporate instructions into an update package, in order to back up the update agent 129 during a tri-phase boot process. In such an approach, the generator 139 may use the location of an update agent write unit (e.g., 209 of FIG. 2) and the location of a reserved write unit (e.g., 211 of FIG. 2) during the generation of an update package. The update agent write unit may be defined as the location where an update agent is currently stored/resident. The generator 139 may instruct an update agent such as the update agent 129, for example, to shift an update agent write unit (e.g., 209) that contains the update agent 129, to the location of a reserved write unit (e.g., 211). This may be done as an initial action of the update agent 129, and may be referred to as an "implicit" approach. In a related representative embodiment, the generator 139 may cause the update agent 129 to initially shift the update agent write unit 209 to the reserved write unit 211, for example, and finally as a last step in the update process, shift back to the previous update agent write unit. It should be noted that in a representative embodiment of the present invention, write units may not be uniform in size. Therefore, a representative embodiment of the present invention may handle such additional complexity due to the use of various write unit sizes, when such update agent write units are shifted.

In a representative embodiment of the present invention, a generator such as, for example, the generator 139 may employ a predictor element (not shown). Such a predictor may employ information indicating that the predictor component of the generator 139 may not perform instruction prediction on an update agent write unit like update agent write unit 209, for example. In a representative embodiment of the resent invention that employs a self-backup mechanism, all the contents, including an update agent such as the update agent 12, for example, may be treated in the same way by the generator 139, for example, and a simpler generation process may be conducted. A benefit of employing such a representative embodiment of the present invention is that a generator like generator 139, for example, may handle a cacheable write unit in the memory space of the device more efficiently.

Figure 5:
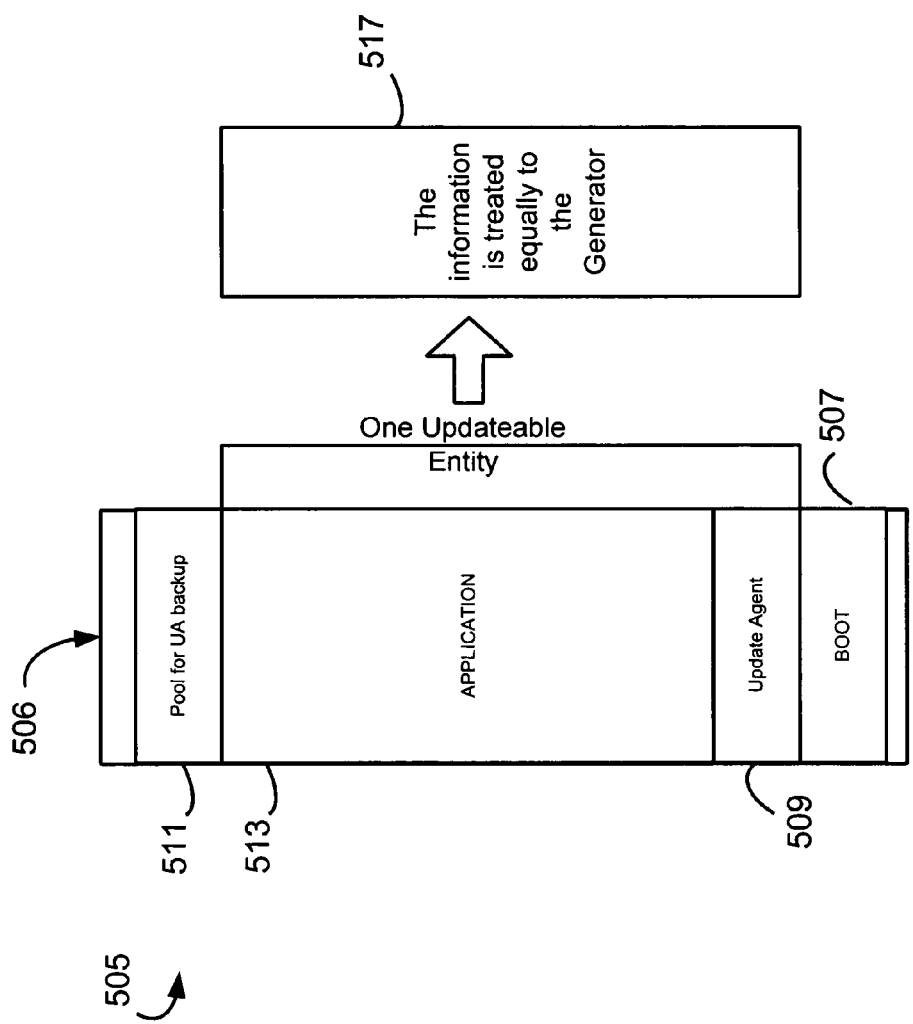
FIG. 5 is a block diagram that depicts an exemplary memory layout of a electronic device that may correspond to, for example, the mobile device of FIG. 1 in which a generator processes an update agent portion and application portion of NV memory as one updateable entity, in accordance with a representative embodiment of the present invention.

FIG. 5 is a block diagram that depicts an exemplary memory layout 505 of a electronic device that may correspond to, for example, the mobile device 109 of FIG. 1 in which a generator processes an update agent portion 509 and application portion 513 of NV memory 506 as one updateable entity 517, in accordance with a representative embodiment of the present invention. The updateable entity 517 may omit a boot code portion 507 and free space within the NV memory 506. A generator such as the generator 139 of FIG. 1, for example, may treat the entire information contained in the updateable entity 517 equally. That is, in a representative embodiment of the present invention, no specific block of the NV memory 506 may be treated differently or in any special way during processing by a generator like the generator 139, for example.

In a representative embodiment of the present invention, a predictor component (not shown) of a generator such as the generator 139 may perform prediction on the update agent write unit 509 portion of the NV memory 506 during processing. The generator 139 may manage cacheable write units more efficiently because the update agent write unit 509 does not need to be shifted to a reserved write unit portion such as, for example, the reserved write unit 211 of FIG. 2. In a representative embodiment of the present invention, performing an update of an update agent such as the update agent 129, for example, in a NAND memory based platform using the skip-move method described above is simpler than prior methods.

In a representative embodiment of the present invention, a boot loader such as, for example, the boot code 507 may use a backup copy of an update agent such as, for example, that stored in a reserved write unit such as the memory pool 511 of FIG. 5, for example. An important aspect of implementing the self-backup update agent of a representative embodiment of the present invention is that a boot loader such as the boot code 507 may select to use a backup copy of an update agent (e.g., in a reserve write unit such as memory pool 511) first, if the integrity of the backup copy can be verified. A reason for doing so is that the backup copy may have the longest life-cycle during an update, and may not be the source copy. If a backup copy of an update agent exists in NV memory of an electronic device such as, for example, the mobile device 109 of FIG. 1, a representative embodiment of the present invention may always chose to use the backup copy.

In a representative embodiment of the present invention, a boot loader such as the boot code 507 may know which copy of an update agent is used for a given instance of a tri-phase boot, for example, the source (e.g., the update agent 509) or the backup (e.g., the update agent in memory pool 511) copy. If a source copy is used, the boot loader (e.g., boot code 507) may inform the update agent (e.g., update agent 509) that a self-backup is involved. This passing of information may be implemented, for example, by a parameter or value that is passed through a microprocessor register, for example, from the boot loader (e.g., boot code 507) to the update agent (e.g., update agent 509).

In a representative embodiment of the present invention, a self-backup may be performed after a location for resumption of a (possibly interrupted) update process is determined. The determination of a resumption location may employ, for example, firmware and/or software referred to by the name "ua_surveyor_getResumeIndex( )". The self-backup may then be performed and, if successful, an update of the remaining code in the memory of an electronic device may be performed using, for example, firmware and/or software that may be referred to by the name "ua_engine_transform( )".

In a representative embodiment of the present invention, a backup copy of the update agent (e.g., stored in memory pool 511) may be destroyed, to guarantee that the updated version of the update agent will be loaded correctly for a next update. The clearing or destruction of the backup copy of an update agent may occur if at least one of the following conditions is true:
  a) the update of the electronic device performed by, for example, the "ua_engine_transform( )" firmware and/or software returns successfully,
  b) the self-backup cannot be performed successfully, or
  c) the self-backup update agent (e.g., the update agent in memory pool 511 which is a copy of the update agent 509) cannot be verified after the self-backup is performed.

In a representative embodiment of the present invention, the destruction of the backup copy (e.g., an update agent stored in memory pool 511) may be performed at one of the following points in the update process:
  a) If a failure during the freeing of temporary write units (e.g., using a routine that may be named "ua_engine_eraseTemporaryWriteUnits( )") will not cause an update retry, the self-backup may be performed before the freeing of temporary write units (e.g., using "ua_engine_eraseTemporaryWriteUnits( )") is performed.
  b) If a failure during the freeing of temporary write units (e.g., using a routine that may be named "ua_engine_eraseTemporaryWriteUnits( )") will cause an update retry, the self-backup destroy may be performed after the freeing of temporary write units (e.g., using "ua_engine_eraseTemporaryWriteUnits( )") completes successfully.

Figure 6:
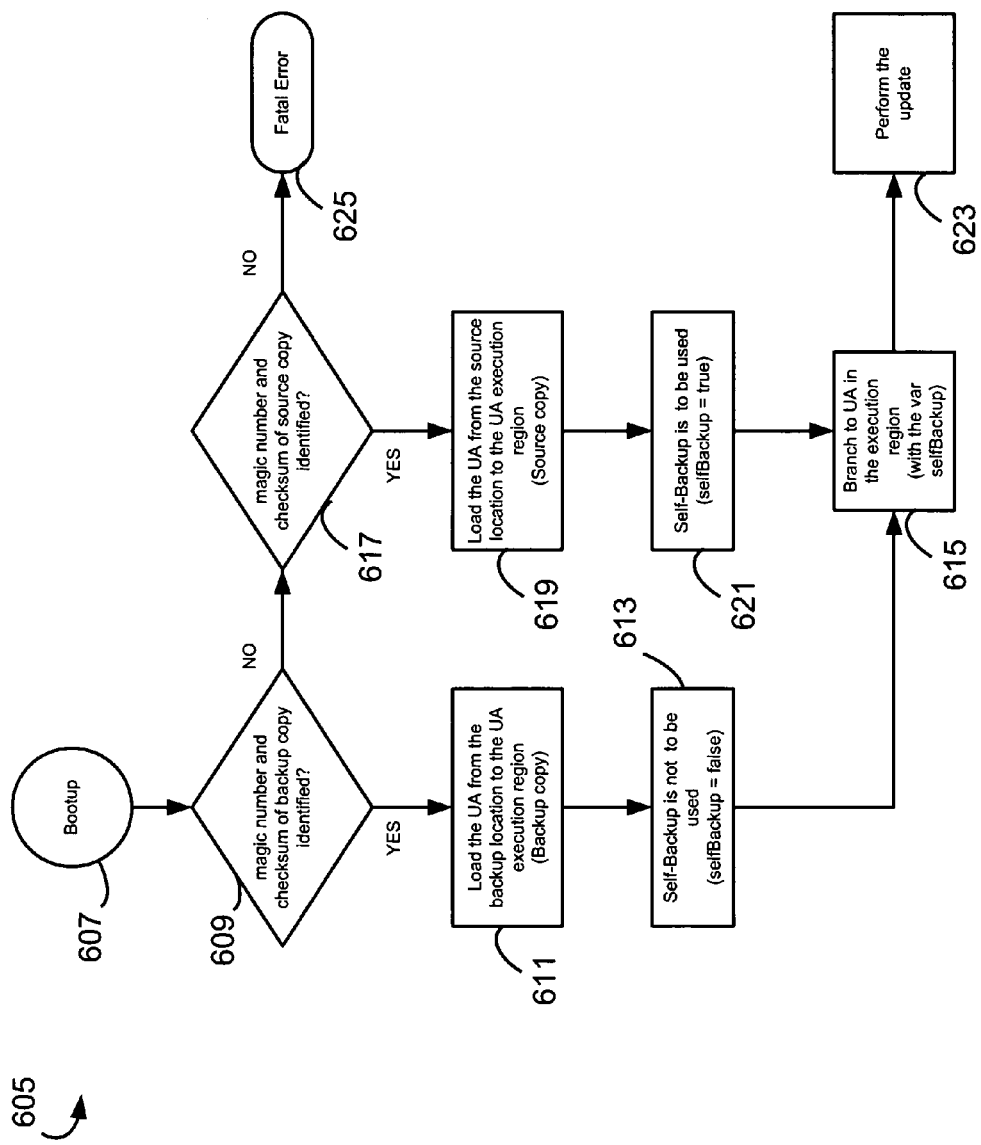
FIG. 6 is a flowchart of an exemplary tri-phase boot process in a NOR memory based electronic device that may correspond to, for example, the mobile device of FIG. 1 in which an update agent such as the update agent of FIG. 3 conducts a self-backup, in accordance with a representative embodiment of the present invention.

FIG. 6 is a flowchart of an exemplary tri-phase boot process 605 in a NOR memory based electronic device that may correspond to, for example, the mobile device 109 of FIG. 1 in which an update agent such as the update agent 309 of FIG. 3 conducts a self-backup, in accordance with a representative embodiment of the present invention. The method illustrated in FIG. 6 begins at a block 607, following boot-up (e.g., a re-boot or an application of power to the electronic device) when boot code is executed. The boot code may correspond to the boot code 307 of FIG. 3, for example. Then, at a next decision block 609, an attempt is made, for example, to identify a particular "magic number" and checksum in a backup copy of an update agent in the memory of the electronic device such as, for example, a backup copy of an update agent that may exist in memory pool 311 of FIG. 3. In a representative embodiment of the present invention, a "magic number" may comprise a predetermined sequence of data stored in memory, that may be used to identify an associated region or portion of memory as containing a particular form of data or being a part of a particular piece of firmware and/or software. If the magic number and checksum of the backup copy of the update agent cannot be determined/identified/verified then, at a next decision block 617, an attempt may be made to identify the magic number and checksum of a source copy of an update agent such as, for example, the update agent 309 of FIG. 3. If the magic number and checksum is not found at the location of the source copy (e.g., at update agent 309) then, at a next block 625, a fatal error may be flagged and processing of the method of FIG. 6 stops.

If, however, the magic number and checksum of the source copy of the update agent (e.g., update agent 309) is determined/identified/verified at the block 617 then, at a next block 619, the update agent from the source location (e.g., the update agent 309) may be loaded/copied to an update agent execution region such as, for example, the RAM 315. Then, at a next block 621, a flag may be set to indicate that a self-backup is to be used. For example, a "selfBackup" flag stored in the memory of the electronic device may be set to 'true'. Then, at a next block 615, control may be passed to (e.g., using a branch command) to the copy of the update agent in the execution region (e.g., RAM 315), along with the self-Backup flag (or, for example, using an alternate mechanism to indicate the same information) that indicates that the self-Backup is to be used. Subsequently, at a next block 623, the update activity is conducted. Then the process of FIG. 6 then terminates.

If, at the block 609, the magic number and checksum of the backup copy of the update agent is determined/identified/verified then, at a next block 611, the update agent from the backup location (e.g., the update agent backup copy in memory pool 311) may be loaded to the update agent execution region (e.g., RAM 315). Then, at a next block 613, a flag may be set to indicate that self-backup is not to be used. For example, a "selfBackup" flag in the memory of the electronic device may be set to 'false'. Then, at the next block 615, control may be passed to (e.g., using a branch command) to the update agent in the execution region (e.g., RAM 315), along with the selfBackup flag (or, for example, an alternate mechanism to indicate the same information) that indicates that the selfBackup is not to be employed.

Figure 7:
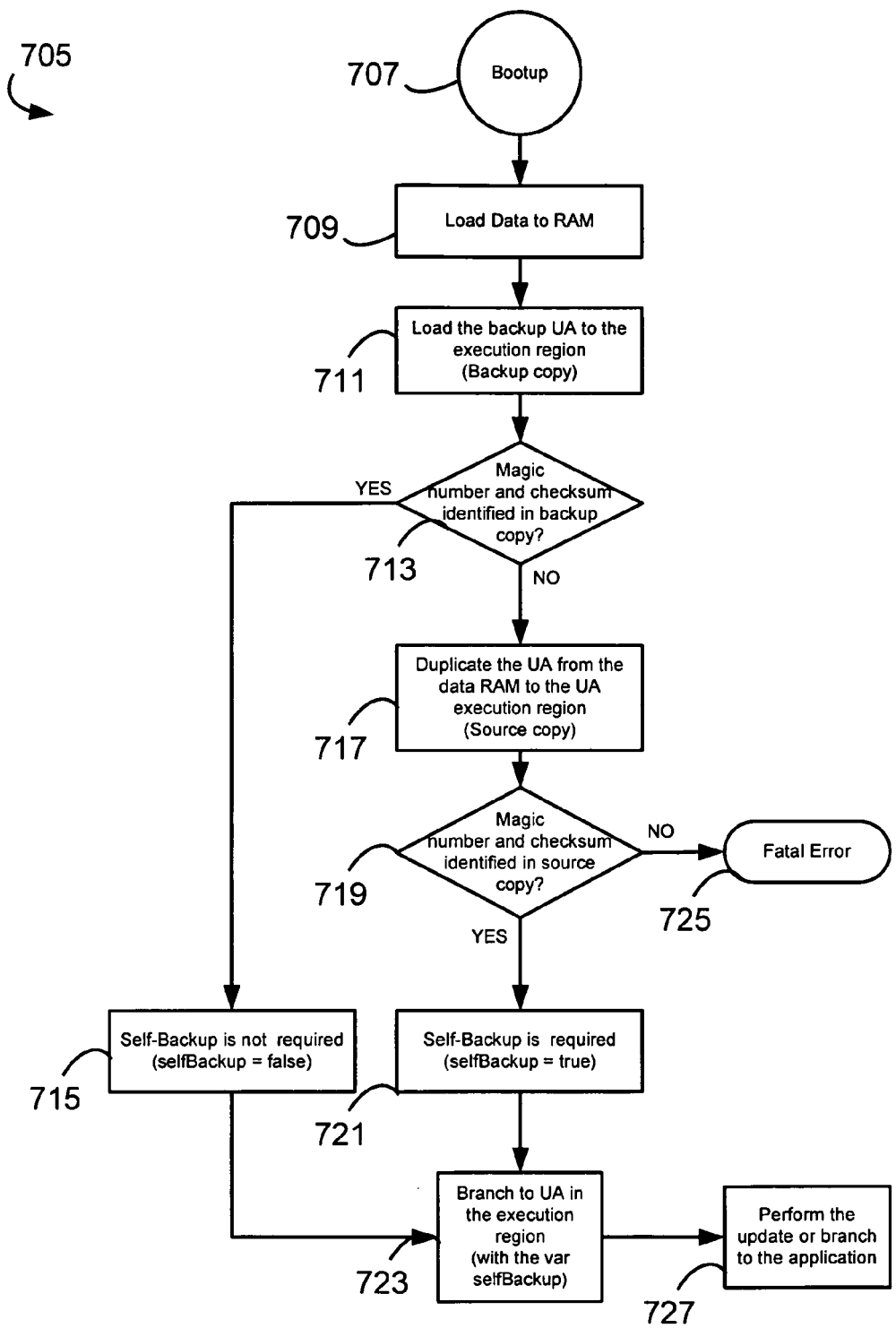
FIG. 7 is a flowchart of an exemplary tri-phase boot process in an electronic device employing NAND-based non-volatile memory such as the mobile device of FIG. 1, in which an update agent such as, for example, the update agent of FIG. 4 conducts a self-backup, in accordance with a representative embodiment of the present invention.

FIG. 7 is a flowchart of an exemplary tri-phase boot process 705 in an electronic device employing NAND-based non-volatile memory such as the mobile device 109 of FIG. 1, in which an update agent such as, for example, the update agent

409 of FIG. 4 conducts a self-backup, in accordance with a representative embodiment of the present invention. The method illustrated in FIG. 7 begins at a block 707, following boot-up (e.g., a re-boot or an application of power to the electronic device) when boot code is executed. The boot code may correspond to the boot code 407 of FIG. 4, for example. At a start block 707, the boot-up sequence starts. Then, at a next block 709, the contents of NAND flash NV memory such as, for example, the NAND flash NV memory 406 comprising the update agent 409 and the application code 413 may be loaded into RAM such as the update agent portion 419 and application code portion 417 of the RAM 420, respectively, using the skip-move approach describe previously with respect to FIG. 4. This may be performed because the operation of NAND memory does not typically support the in-place execution of code. Then, at a next block 711, the backup copy of the update agent from, for example, the memory pool 411 of NAND flash NV memory 406 may be loaded into an update agent execution region such as the update agent execution region RAM 415 of FIG. 4. Then, at a next block 713, an attempt is made to determine/identify/verify a "magic number" and checksum in the backup copy (e.g., in memory pool 411 of FIG. 4) as described above, for example. If, at the decision block 713, the magic number and checksum in the backup copy (e.g., memory pool 411) are determined/identified/verified then, at a next block 715, a flag may be set to indicate that the self-backup is not to be used. For example, a flag called "selfBackup" in the memory of the electronic device may be set to 'false'. Then, at a next block 723, control may be passed (e.g., using a branch instruction) to the update agent in the update agent execution region (e.g., RAM 415), along with an indicator or flag signaling whether a self-backup is to be used. Finally, at a next block 727, the update agent in the execution region (e.g., RAM 415) may perform an update, if desired, or control may be passed to a application firmware and/or software in the electronic device.

If, at the decision block 713, the magic number and checksum in the backup copy (e.g., memory pool 411) are not determined/identified/verified then, at a next block 717, an update agent such as, for example, the update agent 419 may be copied from the data loaded from NAND flash NV memory 406 into RAM, to create a duplicate update agent in the update agent execution region 415, for example. This would ensure that the source copy of the update agent (e.g., update agent 409) will be executed. Then, at a next decision block 719, an attempt may be made to determine/identify/verify the magic number and checksum of the duplicated update agent (e.g., the source copy, update agent 409, for example) in the execution region (e.g., RAM 415). If the magic number and the checksum are not identified then, at a next terminal block 725, a fatal error may be flagged, and the process of FIG. 7 may terminate.

If, on the other hand, at the decision block 719, the magic number and the checksum are determined/identified/verified then, at a next block 721, a flag may be set to indicate that a self-backup is to be conducted. For example, a flag called "selfBackup" resident in the memory of the electronic device may be set to 'true'. Then, at a next block 723, control may be passed (e.g., using a branch instruction) to the update agent in the update agent execution region (e.g., RAM 415), along with an indicator or flag signaling whether a self-backup is to be used. Finally, at a next block 727, the update agent in the execution region (e.g., RAM 415) may perform an update, if desired, or control may be passed to a application firmware and/or software in the electronic device.

Figure 8:
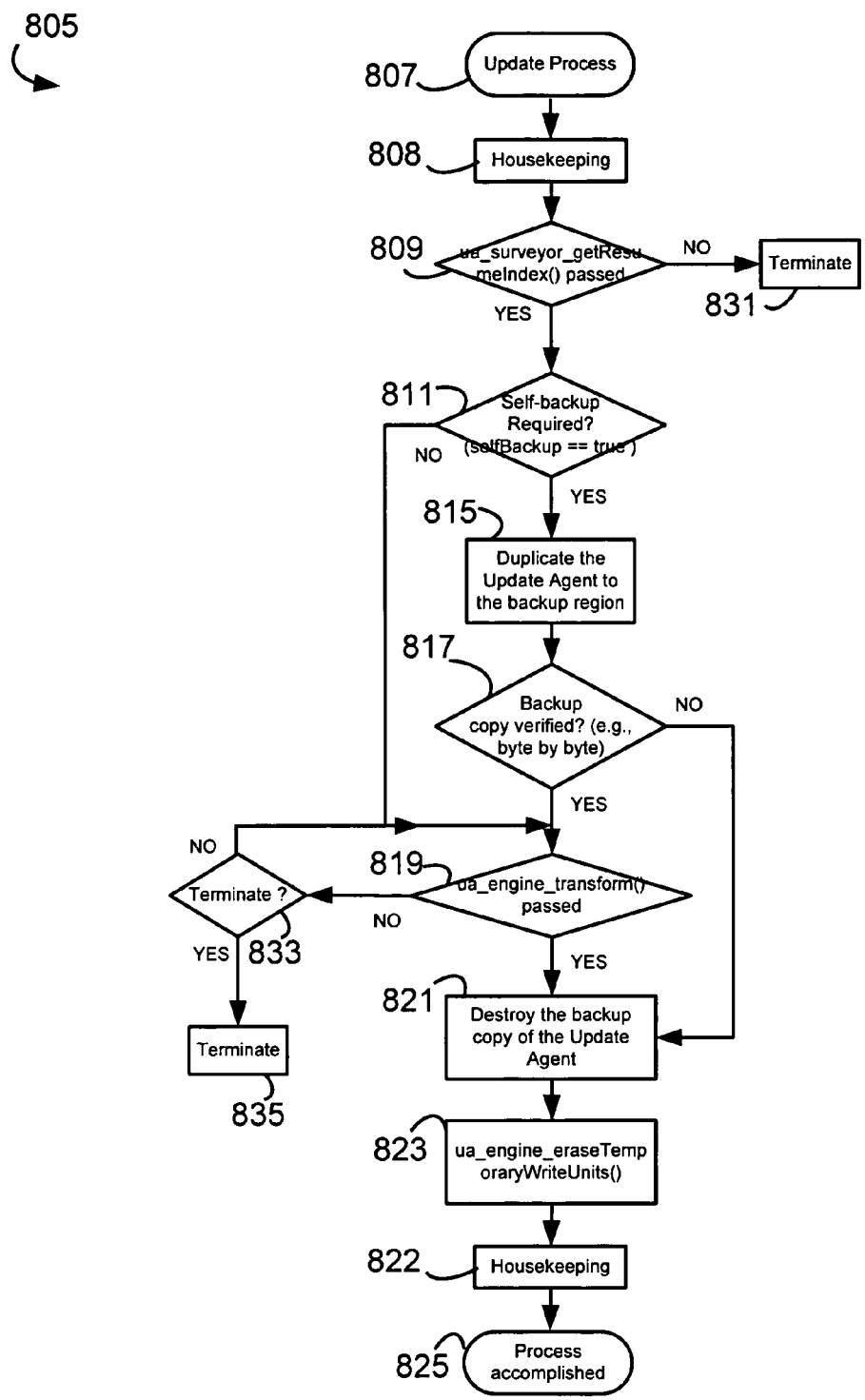
FIG. 8 is a flowchart illustrating an exemplary update process, in accordance with a representative embodiment of the present invention.

FIG. 8 is a flowchart illustrating an exemplary update process 805, in accordance with a representative embodiment of the present invention. The example of FIG. 8 represents some of the operations performed by referring to the name of exemplary functions or routines that may perform those operations. For example, a routine that may be named "ua_engine_erase-TemporaryWriteUnits( )" may be employed to free write units in memory, and a routine that may be named "ua_surveyor_getResumeIndex( )" may be employed to determine the point at which an interrupted update process is to be resumed. A routine that may be named "ua_engine_transform( )" may perform an update of firmware and/or software in the memory of an electronic device, using the contents of an update package (a.k.a., update information). In some representative embodiments of the present invention, a value returned by a function such as, for example, "ua_engine_eraseTemporaryWriteUnits( )" may not be processed.

The method illustrated by FIG. 8 begins, at block 807, at some point after power-up or re-boot of an electronic device such as, for example, the mobile device 109 of FIG. 1. The method of FIG. 8 may, at block 808, perform housekeeping functions such as, for example, initialization of variable related to the later actions of the method of FIG. 8. Next, at decision block 809, a function named "ua_surveyor_getResumeIndex( )" may be invoked to determine the index in a series of banks of memory at which a previous update attempt was prematurely terminated. Such an interruption may be due to, for example, power failure (e.g., battery exhaustion or removal) or user action (e.g., activation of the "OFF" button). If determination of the bank index is successful then, at a next block 811, an attempt is made to determine whether a self-backup of the update agent in the electronic device is to be conducted. If it is determined that the self-backup is not necessary then, at a next block 819, the update process may be performed by, for example, a function or routine named "ua_engine_transform( )". Such a routine may execute the transforms/conversion that constitute the update process, where each transform may involve one or more banks of memory, in some bank order. If the update process is successful then, at a next block 821, the backup copy of the update agent may be destroyed. Next, at block 823, the temporary write units employed during the update process may be freed using, for example, a routine named "ua_engine_eraseTemporaryWriteUnits( )". In a representative embodiment of the present invention, this may be done to clean up transient data. Additional housekeeping may be performed, at block 822, to restore registers, save variable or status information, free other storage, and other details of the end of the update process that are not of importance in this illustration. Finally, at block 825, the update process is completed, and the method illustrated in FIG. 8 ends.

If, at the decision block 809, the determination of bank index (e.g., using a routine "ua_surveyor_getResumeIndex( )") is not completed (i.e., passed) successfully, the update agent process of FIG. 8 may terminate, at block 831. This may comprise an appropriate message being displayed to the user to indicate that the update process is being terminated, and may solicit user acknowledgement or selection of further action. In one representative embodiment of the present invention, the update agent may transfer control to a boot loader to resume the normal operation. This may be done only after resetting flags that make the boot code bypass the update process and resume normal operation.

If it is determined, at the decision block 811, that the self-backup is to be performed then, at a next block 815, a source copy of an update agent may be duplicated into a backup region. Then, at a next block 817, an attempt is made to verify the backup copy just created employing, for example, a byte-by-byte comparison technique. Other techniques of verifying the backup copy are also anticipated and may be employed without departing from the spirit and scope of the present invention. If, at the block 817, the backup copy is successfully verified (i.e. found valid and proper) then, at decision block 819, a function such as, for example, "ua_engine_transform( )" described above may be invoked to execute the transforms/conversions that may be employed in an update process in accordance with a representative embodiment of the present invention. If the "ua_engine_transform( )" function/routine completes successfully (i.e., passes) then, at block 821, the backup copy of the update agent is destroyed, and the method continues as described above.

If, at decision block 819, the conversion/transformation operations of the routine/function "ua_engine_transform( )" does not complete successfully (i.e., does not pass) then, at decision block 833, a determination is made whether termination of the update process is appropriate. If it is determined that the process is to be terminated then, at block 835, the update process is terminated and cleanup is attempted. An appropriate message may be displayed to the user to indicate that the update process terminated. If, at the decision block 833, it is determined to that the update process is to continue (e.g., to retry one or more update related transforms) then the update operations of the "ua_engine_transform( )" routine/function may be invoked again, at block 819. In a representative embodiment of the present invention, the update process may be retried a number of times before the method of FIG. 8 terminates, at block 835.

Figure 9:
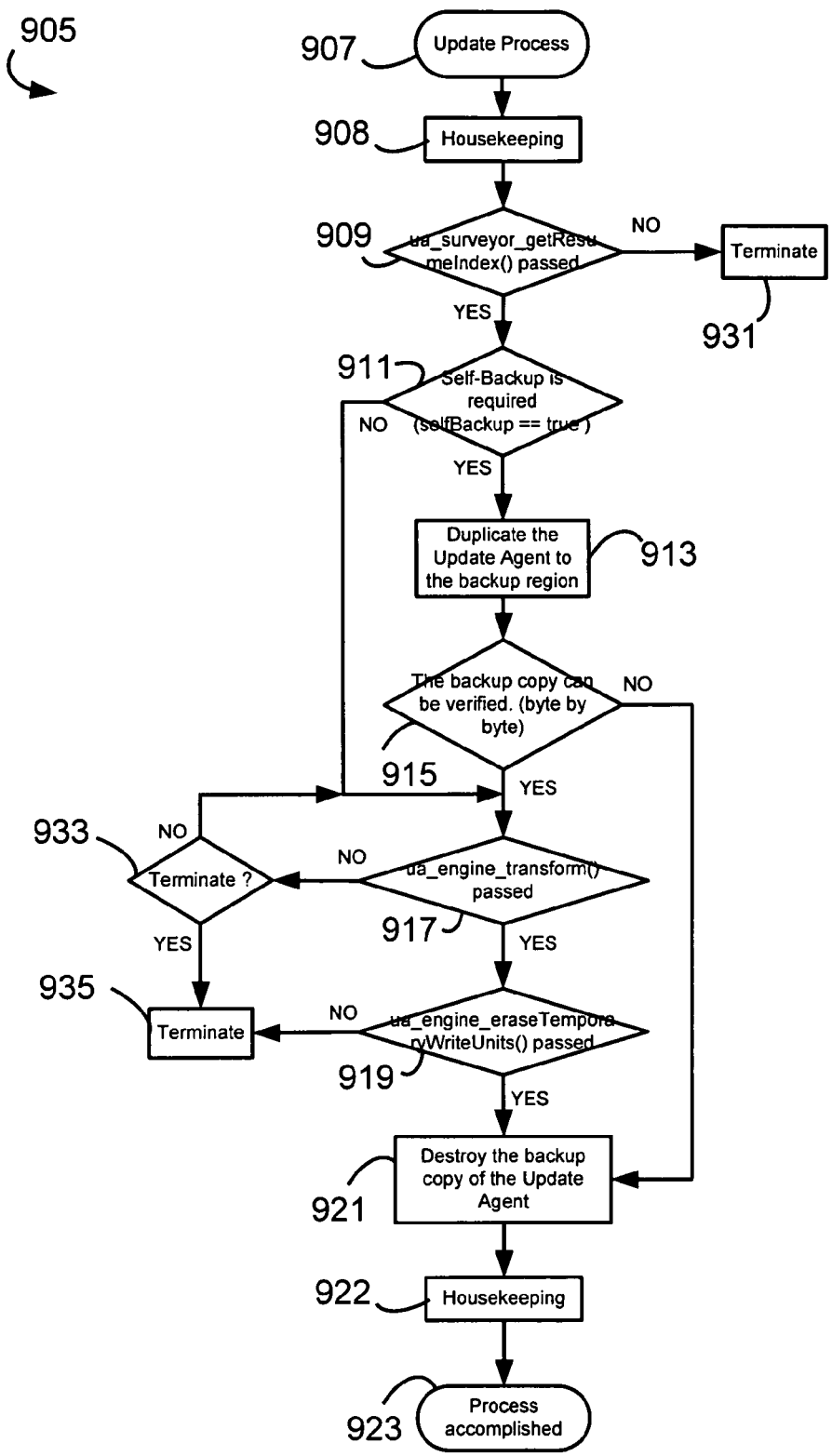
FIG. 9 is a flowchart illustrating another exemplary update process, in accordance with a representative embodiment of the present invention.

FIG. 9 is a flowchart illustrating another exemplary update process 905, in accordance with a representative embodiment of the present invention. As was done in FIG. 8, the example of FIG. 9 represents some of the operations performed by referring to the name of exemplary functions or routines that may perform those operations. For example, a routine that may be named "ua_engine_eraseTemporaryWriteUnits( )" may be employed to free write units in memory, and a routine that may be named "ua_surveyor_getResumeIndex( )" may be employed to determine the point at which an interrupted update process is to be resumed. A routine that may be named "ua_engine_transform( )" may perform an update of firmware and/or software in the memory of an electronic device, using the contents of an update package (a.k.a., update information). In a representative embodiment of the present invention, a value returned by a routine or function such as, for example, "ua_engine_eraseTemporaryWriteUnits( )" may be processed.

The method illustrated by FIG. 9 begins, at block 907, at some point after power-up or re-boot of an electronic device such as, for example, the mobile device 109 of FIG. 1. The method of FIG. 9 may then, at block 908, perform housekeeping functions such as, for example, initialization of variable related to the later actions of the method of FIG. 9. Next, at decision block 909, a function or routine that determines the index of a bank of memory where a previous attempt to update was prematurely terminated due to an interruption such as, for example, power failure or battery removal, or user action. Such a function/routine may, for example, be named "ua_surveyor_getResumeIndex( )". If the function/routine completes successfully then, at block 911, an attempt may be made to determine whether a self-backup of the update agent is to be conducted. If it is determined that a self-backup is not to be conducted then, at block 917, a function may be invoked to execute the one or more conversions/transforms that are employed in the update process, where each transform may involve one or more banks of memory in some bank order. The function/routine employed by a representative embodiment of the present invention may be referred to by the name "ua_engine_transform( )", for example.

If, at block 909, the function that determines the memory bank index where an interruption occurred during a previous update attempt (e.g., "ua_surveyor_getResumeIndex( )" is not successful then, at block 931, the update process of FIG. 9 may terminate with a message to a user. In a representative embodiment of the present invention, the user may be prompted to request commencement of normal device operation after the message is displayed.

Following the successful completion of the conversion/transformation, at block 917, the temporary write units used may be freed, at block 919. This may employ a function/routine named "ua_engine_eraseTemporaryWriteUnits( )", for example. In a representative embodiment of the present invention, this may be done to clean up transient data. Next, at block 921, the backup copy of the update agent may be destroyed. Additional housekeeping may be performed, at block 922, to restore registers, save variable or status information, free other storage, and perform other details of the end of the update process that are not pertinent to this illustration. The update process illustrated in FIG. 9 is then complete, at block 923.

If, at decision block 911, it is determined that a self-backup is to be used then, at block 913, a source copy of an update agent may be duplicated into a backup region. Then, at block 915, an attempt may be made to verify the created backup copy employing, for example, a byte-by-byte comparison technique. Other techniques of verification are also anticipated. If, at block 915, the backup copy is successfully verified (i.e., found valid and proper) then, at decision block 917, a function/routine may be invoked to execute one or more transforms/conversion that may be employed in the update process. The conversion/transforms may be performed, for example, by a function/routine name "ua_engine_transform( )". If the conversion/transformation is not successful, at block 917, then a determination may be made, at decision block 933, as to whether termination of the update process is appropriate. This may include, for example, a number of retries and user prompting for acknowledgement to perform continued update attempts. If termination is not appropriate, the conversion/transformation may be reattempted, at block 917. If termination is determined to be appropriate (e.g., via user response to end the update process) the update process may be terminated, at block 935.

If the invoked conversion/transformation routine/function is successful, at block 917, control may be passed to a routine/function, at block 919, that may be named "ua_engine_eraseTemporaryWriteUnits( )", for example, and that may attempt to clean up one or more temporary write units that were used during the update. A failure to erase these temporary write units may indicate a hardware failure, which may represent a fatal error, or a failure of a device driver for a flash memory unit. If the freeing of temporary write units is unsuccessful, the failure may be treated as fatal, in which case a message may be displayed, as appropriate, and the update process may terminate, at block 935. If the freeing of temporary write units succeeds, this indicates that cleanup of temporary write units was complete and, at block 921, the backup copy of the update agent may be destroyed. Additional housekeeping may then be performed, at block 922, to restore registers, save variable or status information, free other storage, and perform other details of the end of the update process that are not pertinent to this illustration. The method of FIG. 9 then ends, at block 923.

If, at block 915, the backup copy is not successfully verified then, at block 921, the backup copy of the update agent is destroyed. Additional housekeeping may then be performed, at block 922, to restore registers, save variable or status information, free other storage, and perform other details of the end of the update process that are not pertinent to this illustration. The update process illustrated in FIG. 9 is then complete, at block 923.

Figure 10:
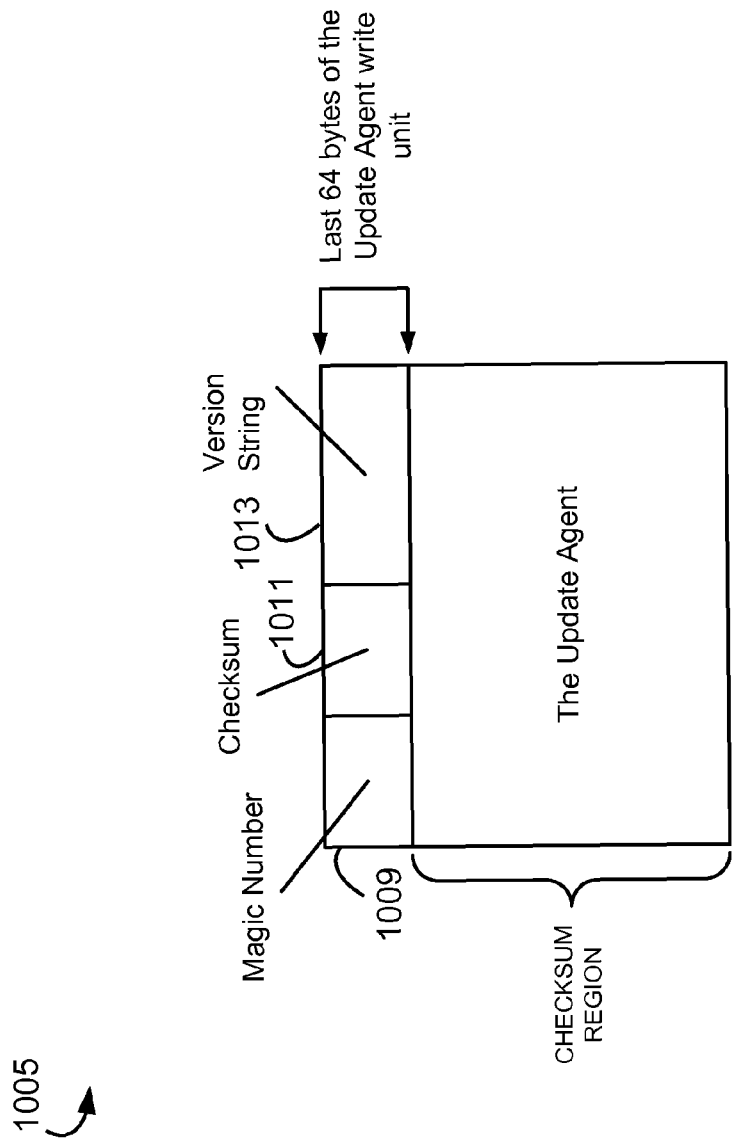
FIG. 10 depicts a memory image of an exemplary update agent write unit in which the last 64 bytes of the update agent write unit are used for the determination/identification/verification purposes described above, in accordance with a representative embodiment of the present invention.

FIG. 10 depicts a memory image of an exemplary update agent write unit 1005 in which the last 64 bytes of the update agent write unit 1005 are used for the determination/identification/verification purposes described above, in accordance with a representative embodiment of the present invention. In the representative embodiment shown in the illustration of FIG. 10, the last 64 bytes of the update agent write unit 1005 comprises a "magic number" 1009 that may, for example, four bytes in length. The update agent write unit 1005 of FIG. 10 also comprises a checksum 1011 that may, for example, be four bytes in length. In addition, the update agent write unit 1005 comprises a version string 1013 that may be 58 bytes in length, for example. The magic number 1009 may comprise a string of ASCII characters such as, for example, "BitC", and may have the hexadecimal value 0x43746942 in the little endian byte order, or 0x42697443 in the big endian byte order. Other values for the magic number are contemplated and may employed without departing from the spirit and scope of the present invention.

In a representative embodiment of the present invention, a variety of algorithms may be employed for computing the checksum 1011. The algorithms employed may be based on algorithms used by other firmware and/or software within an electronic device like the boot loader 127 in the mobile device 109, for example. It reduces the footprint of the boot loader implementation. In some representative embodiments of the present invention, the last 64 bytes of the update agent write unit 1005 may be excluded from computation of the checksum 1011, to avoid a cyclic problem.

In a representative embodiment of the present invention, the version string 1013 may, for example, comprise a version label from a particular file of source code such as, for example, a file named "uaversion.c" that may be used during development of the firmware and/or software.

In a representative embodiment of the present invention, the new update agent (i.e., that update agent updated from an older one) may understand update status data (USD) used by an older version of update agent. This may be of particular importance to make this above-described self-backup mechanism work efficiently and reliably, if the USD logic changes between the two update agent versions. Understanding of USD from an older version of update agent by a newer update agent provides backward compatibility during a transition from old USD to new USD. In some representative embodiments of the present invention, a new update agent may know how to reset the older version of USD logic. For example, an interruption (e.g., a power failure) may occur after destroying/clearing the backup update agent, but before USD is reset (e.g., from an old format to a new format). The boot loader may subsequently load the new version of the update agent following the next boot up, because the old version of the update agent has been destroyed/cleared, and the new update agent may have need to process the old USD (e.g., format and logic). A representative embodiment of the present invention properly handles the transition by incorporating logic in the new update agent to process both an older and the new USD formats and associated data.

Aspects of the present invention may be seen in a method of updating at least one of: firmware and software in an electronic device having update agent code. Such a method may comprise creating a backup copy of the update agent code, authenticating update information, and executing the update agent code to update the at least one of: firmware and software in the electronic device using the update information. In a representative embodiment of the present invention, creating a backup copy of the update agent code may comprise detecting whether a backup copy of the update agent code exists, and copying a source copy of the update agent code into a backup location to create the backup copy of the update agent code, if the backup copy of the update agent code does not exist.

Executing the update agent code may comprise running the backup copy of the update agent code, if the backup copy of the update agent code exists and is valid. Executing the update agent code may also comprise running the source copy of the update agent code, if the backup copy does not exist or is not valid. In addition, executing the update agent code may comprise deleting the backup copy of the update agent code at the end of the updating. Running the backup copy of the update agent code may comprise transferring the backup copy of the update agent code into an update agent section of random access memory (RAM), and invoking the update agent code in the update agent section in random access memory (RAM). Running the source copy of the update agent code may comprise transferring the source copy of the update agent code into an update agent section of random access memory (RAM), and invoking the update agent code in the update agent section in random access memory (RAM). In a representative embodiment in accordance with the present invention, update information may comprise an update package, and update information may comprise a set of executable instructions for converting a first version of code to a second version of code.

Other aspects of the present invention may be found in an electronic device comprising a non-volatile memory containing a firmware, update agent code resident in the non-volatile memory, and wherein the update agent code, when executed, creates a backup copy of the update agent code during an update of the firmware. Such an embodiment may also comprise update information used by the update agent code to update the firmware, and the update agent code may implicitly create the backup copy of the update agent code using the update information, during the update of the firmware. The update information used by the update agent code to update the firmware may comprise executable instructions to implicitly create a backup copy of the update agent in a backup section of the non-volatile memory. Creation of the backup copy of the update agent code during the update of firmware may occur proximate the beginning of the update.

In a representative embodiment of the present invention, the electronic device may comprise update information used by the update agent code to update the firmware, and the update agent code may explicitly create the backup copy of the update agent when the update of firmware is invoked, before conducting the update of the firmware using the update package. Such an embodiment may also comprise boot code that is executed immediately after a reboot of the electronic device, and random access memory (RAM) into which the update agent is loaded for execution. The boot code may determine which one of: the update agent code resident in the non-volatile memory and the backup copy of the update agent code is to be loaded into the random access memory (RAM). The boot code may load the determined one of: the update agent code resident in the non-volatile memory and the backup copy of the update agent code into the random access memory (RAM), and may cause execution of the loaded update agent code.

In a representative embodiment of the present invention, the boot code may determine which one of: the update agent code resident in the non-volatile memory and the backup copy of the update agent code to be loaded into the random access memory (RAM) based on at least one of: a predefined data sequence and a checksum associated with each update agent code. The boot code may communicate a parameter to an update agent code loaded to the random access memory (RAM), and the parameter may indicate that backup of the update agent code prior to updating of firmware by the update agent is to be performed. The executed update agent code may cause removal of the backup copy of the update agent code proximate the end of updating of firmware. In addition, the executed update agent code may terminate updating of firmware without removing the backup copy of the update agent code, if at least one of: the update information is corrupt and the updating of firmware is not successful.

In a representative embodiment of the present invention, the non-volatile memory may comprise NAND-based non-volatile memory, and the boot code may load firmware, including update agent code, from non-volatile memory into random access memory (RAM) for execution. The boot code may determine which one of: update agent code in random access memory (RAM) and a backup copy of update agent code in non-volatile memory is to be used, and may load the determined one into an update agent execution section in random access memory (RAM). The boot code may cause execution of code loaded into the update agent execution section in random access memory (RAM). In another representative embodiment of the present invention, the non-volatile memory may comprise NOR-based non-volatile memory. The boot code may determine which one of: update agent code in non-volatile memory and a backup copy of update agent code in non-volatile memory is to be used, may load the determined one into RAM for execution, and may cause execution of update agent code loaded in the random access memory (RAM).

Yet other aspects of the present invention may be observed in an updatable electronic device comprising non-volatile memory containing resident update agent code and a firmware. The resident update agent code may be executable by a processor to cause updating of the firmware in the non-volatile memory, and to cause updating of the resident update agent code. Execution of the resident update agent code may create a backup copy of the resident update agent code in the non-volatile memory, before updating the firmware and the resident update agent code. The resident update agent code in non-volatile memory may be located in a portion of non-volatile memory, and the portion may comprise validation information for identifying the resident update agent code. The validation information may comprise a predefined sequence of data, a checksum, and a version string. A representative embodiment of the present invention may comprise first update status data comprising state information of an update activity. The resident update agent code may update the resident update agent code to produce new update agent code that employs second update status data, and the new update agent code may be capable of employing the first update status data as well as the second update status data.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of updating at least one of: firmware and software in an electronic device having update agent code, the method comprising:

authenticating to obtain an update package, wherein the update package includes at least executable instructions for converting a version of code to an updated version of the code;

executing the update agent code to create a backup copy of the update agent code only if the update package indicates that the update package affects the update agent code itself;

executing the update agent code to update the at least one of: firmware and software in the electronic device employing the obtained update package, wherein executing the update agent code to update the at least one of:

firmware and software in the electronic device comprises running the backup copy of the update agent code to update the at least one of: firmware and software, if the backup copy of the update agent code exists and is valid; and running a source copy of the update agent code to update the at least one of: firmware and software, if the backup copy does not exist or is not valid.

2. The method according to claim 1, wherein executing the update agent code to create a backup copy of the update agent code comprises:

detecting whether the backup copy of the update agent code exists; and copying the source copy of the update agent code into a backup location to create the backup copy of the update agent code, if the backup copy of the update agent code does not exist.

3. The method according to claim 1, wherein executing the update agent code to update the at least one of: firmware and software in the electronic device using the update information comprises:

deleting the backup copy of the update agent code at the end of the updating.

4. The method according to claim 1 wherein running the backup copy of the update agent code comprises:
   transferring the backup copy of the update agent code into an update agent section of random access memory (RAM); and
   invoking the update agent code in the update agent section in random access memory (RAM).

5. The method according to claim 1 wherein running the source copy of the update agent code comprises:
   transferring the source copy of the update agent code into an update agent section of random access memory (RAM); and
   invoking the update agent code in the update agent section in random access memory (RAM).

6. The method according to claim 1 wherein update information comprises an update package.

7. The method according to claim 1 wherein update information comprises a set of executable instructions for converting a first version of code to a second version of code.

8. An electronic device comprising:
   a non-volatile memory containing a firmware;
   update agent code resident in the non-volatile memory;
   wherein the update agent code executes, only if an update package including at least executable instructions for converting to an updated version indicates that executing the update package changes the update agent code, to create a backup copy of the update agent code during an update of the firmware;
   boot code that is executed immediately after a reboot of the electronic device;
   random access memory (RAM) into which the update agent code is loaded for execution; and
   wherein the boot code determines which one of: the update agent code resident in the non-volatile memory and the backup copy of the update agent code is to be loaded into the random access memory (RAM), loads the determined one of: the update agent code resident in the non-volatile memory and the backup copy of the update agent code into the random access memory (RAM), and causes execution of the loaded update agent code.

9. The electronic device of claim 8, further comprising:
   update information used by the update agent code to update the firmware; and
   wherein the update agent code implicitly creates the backup copy of the update agent code using the update information, during the update of the firmware.

10. The electronic device of claim 9 wherein the update information used by the update agent code to update the firmware comprises executable instructions to implicitly create the backup copy of the update agent code in a backup section of the non-volatile memory.

11. The electronic device of claim 10 wherein creation of the backup copy of the update agent code during the update of firmware occurs proximate the beginning of the update.

12. The electronic device of claim 8, further comprising:
   update information used by the update agent code to update the firmware; and
   wherein the update agent code explicitly creates the backup copy of the update agent code when the update of firmware is invoked, before conducting the update of the firmware using the update package.

13. The electronic device of claim 8, wherein the boot code determines which one of: the update agent code resident in the non-volatile memory and the backup copy of the update agent code is to be loaded into the random access memory (RAM) based on at least one of: a predefined data sequence and a checksum associated with each update agent code.

14. The electronic device of claim 13, wherein the boot code communicates a parameter to the update agent code loaded to the random access memory (RAM), the parameter indicating that backup of the update agent code prior to updating of firmware by the update agent is to be performed.

15. The electronic device of claim 8, wherein the executed update agent code causes removal of the backup copy of the update agent code proximate the end of updating of firmware.

16. The electronic device of claim 15, wherein the executed update agent code terminates updating of firmware without removing the backup copy of the update agent code, if at least one of: the update information is corrupt and the updating of firmware is not successful.

17. The electronic device of claim 16, wherein:
   the non-volatile memory comprises NAND-based non-volatile memory; the boot code loads firmware, including update agent code, from nonvolatile memory into random access memory (RAM) for execution;
   the boot code determines which one of: update agent code in random access memory (RAM) and the backup copy of update agent code in non-volatile memory is to be used, and loads the determined one into an update agent execution section in random access memory (RAM); and
   the boot code causing execution of code loaded into the update agent execution section in random access memory (RAM).

18. The electronic device of claim 16, wherein:
   the non-volatile memory comprises NOR-based non-volatile memory;
   the boot code determines which one of: update agent code in non-volatile memory and the backup copy of update agent code in non-volatile memoiy is to be used, and loads the determined one into RAM for execution; and
   the boot code causing execution of update agent code loaded in the random access memory (RAM).

19. An updatable electronic device comprising:
   non-volatile memory containing resident update agent code and a firmware;
   wherein the resident update agent code is executable by a processor to cause updating of the firmware in the non-volatile memory;
   wherein the resident update agent code is executable by a processor to cause updating of the resident update agent code;
   wherein execution of the resident update agent code creates a backup copy of the resident update agent code in the non-volatile memory, before updating the firmware and the resident update agent code, and only if an obtained update package indicates that the obtained update package affects the resident agent code itself; and
   wherein execution of the resident update agent code to update the firmware in the non-volatile memory comprises
      running the backup copy of the resident update agent code to update the firmware, if the backup copy of the resident update agent code exists and is valid; and
      running the resident update agent code to update the firmware, if the backup copy does not exist.

20. The updatable electronic device of claim 19 wherein the resident update agent code in non-volatile memory is located in a portion of non-volatile memory, the portion comprising validation information for identifying the resident update agent code.

21. The updatable electronic device of claim 20 wherein the validation information comprises a predefined sequence of data, a checksum, and a version string.

22. The updateable electronic device of claim 21, further comprising:
   first update status data comprising state information of an update activity; wherein the resident update agent code updates the resident update agent code to produce new update agent code that employs second update status data; and
   wherein the new update agent code is capable of employing the first update status data as well as the second update status data.

* * * * *

UNITED STATES PATENT AND TRADEMARK OFFICE
CERTIFICATE OF CORRECTION

| | | |
|---|---|---|
| PATENT NO. | : 7,971,199 B1 | Page 1 of 1 |
| APPLICATION NO. | : 11/120556 | |
| DATED | : June 28, 2011 | |
| INVENTOR(S) | : Shao-Chun Chen et al. | |

It is certified that error appears in the above-identified patent and that said Letters Patent is hereby corrected as shown below:

In column 20, line 35, in Claim 18, delete "memoiy" and insert -- memory --, therefor.

In column 21, line 4, in Claim 22, delete "updateable" and insert -- updatable --, therefor.

Signed and Sealed this
Twentieth Day of December, 2011

David J. Kappos
*Director of the United States Patent and Trademark Office*